United States Patent
Smereka et al.

(10) Patent No.: US 9,305,308 B2
(45) Date of Patent: Apr. 5, 2016

(54) SYSTEM AND METHOD FOR BATCHING CONTENT FOR PLAYBACK ON AN ELECTRONIC DEVICE

(71) Applicant: Myine Electronics, Inc., Ferndale, MI (US)

(72) Inventors: Scott W. Smereka, Warren, MI (US); Donald J. Ebben, Novi, MI (US); Jacob R. Sigal, Ferndale, MI (US)

(73) Assignee: MYINE ELECTRONICS, INC., Ferndale, MI (US)

( * ) Notice: Subject to any disclaimer, the term of this patent is extended or adjusted under 35 U.S.C. 154(b) by 64 days.

(21) Appl. No.: 14/079,359

(22) Filed: Nov. 13, 2013

(65) Prior Publication Data

US 2014/0136330 A1   May 15, 2014

Related U.S. Application Data

(60) Provisional application No. 61/725,857, filed on Nov. 13, 2012.

(51) Int. Cl.
*G06Q 30/00* (2012.01)
*G06Q 30/02* (2012.01)

(52) U.S. Cl.
CPC .................. *G06Q 30/0265* (2013.01)

(58) Field of Classification Search
CPC ......... G01C 15/04; G01S 19/14; G01S 19/35; G01S 19/48; H04L 67/306; H04W 4/043
USPC ...................................................... 705/14, 1
See application file for complete search history.

(56) References Cited

U.S. PATENT DOCUMENTS

| | | | |
|---|---|---|---|
| 7,062,778 B1 | 6/2006 | Pettersson | |
| 7,219,063 B2 | 5/2007 | Schalk et al. | |
| 7,441,192 B2 | 10/2008 | Pisz | |
| 7,552,063 B1 | 6/2009 | McEachern | |
| 8,050,817 B2 | 11/2011 | Moinzadeh et al. | |
| 8,335,709 B2 | 12/2012 | Todd et al. | |
| 2004/0193425 A1 | 9/2004 | Tomes | |
| 2005/0060219 A1 | 3/2005 | Deitering et al. | |
| 2007/0113243 A1 | 5/2007 | Brey | |
| 2007/0226041 A1 | 9/2007 | Oesterling et al. | |
| 2008/0051955 A1 | 2/2008 | Ross et al. | |
| 2009/0076915 A1 | 3/2009 | Tighe | |
| 2009/0094635 A1 | 4/2009 | Aslin et al. | |

(Continued)

FOREIGN PATENT DOCUMENTS

EP   1557810   7/2005
EP   2082190   7/2009

*Primary Examiner* — Daniel Lastra
(74) *Attorney, Agent, or Firm* — Harness, Dickey & Pierce, P.L.C.

(57) ABSTRACT

A system is disclosed for providing advertising (AD) content to a radio system of a vehicle. A smartphone may have a stored application thereon related to a specific broadcast station. A utility application may be associated with the radio system (RS) and used to inform the smartphone when the RS is tuned to the specific broadcast station. The RS may have a processor for detecting a start maker and a stop marker in a broadcast signal being received from the specific broadcast station, and to inform the smartphone when the start marker is detected. The start marker and the stop marker define a time interval where at least one advertisement is present in the broadcast signal. The smartphone may provide AD content to the RS which is inserted for playback during the time interval.

20 Claims, 6 Drawing Sheets

(56) References Cited

U.S. PATENT DOCUMENTS

| | | |
|---|---|---|
| 2010/0023393 A1 | 1/2010 | Costy et al. |
| 2010/0235739 A1 | 9/2010 | Rathi et al. |
| 2012/0131610 A1* | 5/2012 | Fernandez Gutierrez et al. ................ H04N 21/23424 725/34 |
| 2012/0190386 A1* | 7/2012 | Anderson .................. 455/456.3 |
| 2012/0243751 A1 | 9/2012 | Zheng et al. |
| 2012/0249343 A1 | 10/2012 | Thomas |
| 2012/0259541 A1 | 10/2012 | Downey et al. |
| 2012/0265616 A1 | 10/2012 | Cao et al. |
| 2013/0024287 A1 | 1/2013 | MacNeille et al. |

* cited by examiner

SYSTEM AND METHOD FOR BATCHING CONTENT FOR PLAYBACK ON AN ELECTRONIC DEVICE

CROSS-REFERENCE TO RELATED APPLICATIONS

This application claims the benefit of U.S. Provisional Application No. 61/725,857, filed on Nov. 13, 2012. The entire disclosure of the above application is incorporated herein by reference.

FIELD

The present disclosure relates to systems and methods for delivering selected advertising content to an electronic device for playback by the device, and more particularly to a system and method that is able to collect advertising content in "batches", using the electronic device, and then to thereafter have the electronic device select and deliver particular advertisements to the user at selected times.

BACKGROUND

The statements in this section merely provide background information related to the present disclosure and may not constitute prior art.

Advertisers are continuously seeking out ways to provide more targeted (less annoying) and timely advertising to consumers. With the increasing availability of internet service available at various retail establishments such as coffee shops, vehicle dealerships, book stores, etc., the opportunity presents itself to potentially collect and store a variety of advertising content that can be highly targeted to a given consumer. By "targeted" advertising content, it is meant advertising content that is especially well or tailored for the consumer to which it is directed. For example, a consumer over the age of 50 and driving a high end luxury vehicle (e.g., over $75,000) would typically draw interest from different advertisers than a consumer under the age of 25 and driving a subcompact vehicle costing less than $20,000. But up until the present time there has not been an effective way to target advertisements to specific consumers.

SUMMARY

In one aspect the present disclosure relates to a system for providing advertising (AD) content to a radio system of a vehicle. The system may comprise a smartphone having a stored application thereon related to a specific broadcast station. A utility application may be included which his operably associated with the radio system of the vehicle and configured to inform the smartphone when the radio system is tuned to the specific broadcast station. The radio system may include a processor configured to detect a start maker and a stop marker in a broadcast signal being received by the radio system from the specific broadcast station, and to inform the smartphone when the start marker is detected. The start marker and the stop marker may define a time interval where the broadcast station is providing at least one advertisement in the broadcast signal. The smartphone may be configured to provide AD content to the processor of the radio system. The processor may be configured to insert the AD content during the time interval in the broadcast signal for playback using the radio system.

In another aspect the present disclosure relates to a system for providing advertising (AD) content to a user of a radio system of a vehicle. The system may comprise a radio system including a processor configured to detect a start maker and a stop marker in a signal being received by the radio system from the signal source. The start marker and stop marker may define a time interval where the signal source is providing at least one advertisement in the signal. A remote source of targeted advertising content may be provided. The radio system may be configured to receive at least one targeted advertisement from the remote source of targeted advertising content and to store the at least one targeted advertisement for future playback on the radio system. The processor may also be configured to insert the AD content for playback during the time interval in the signal.

In still another aspect the present disclosure relates to a method for providing advertising (AD) content to a radio system of a vehicle. The method may comprise using a smartphone having a stored application thereon related to a specific broadcast station. The method may involve causing the radio system of the vehicle to inform the smartphone when the radio system is tuned to the specific broadcast station. The radio system may be used to detect a start maker and a stop marker in a broadcast signal being received by the radio system from the specific broadcast station. The radio system may be used to inform the smartphone when the start marker is detected. The start marker and the stop marker may define a time interval where the broadcast station is providing at least one advertisement in the broadcast signal. The method may also involve using the smartphone to provide AD content to the radio system and using the radio system to insert the AD content during the time interval in the broadcast signal for playback.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the Figures.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
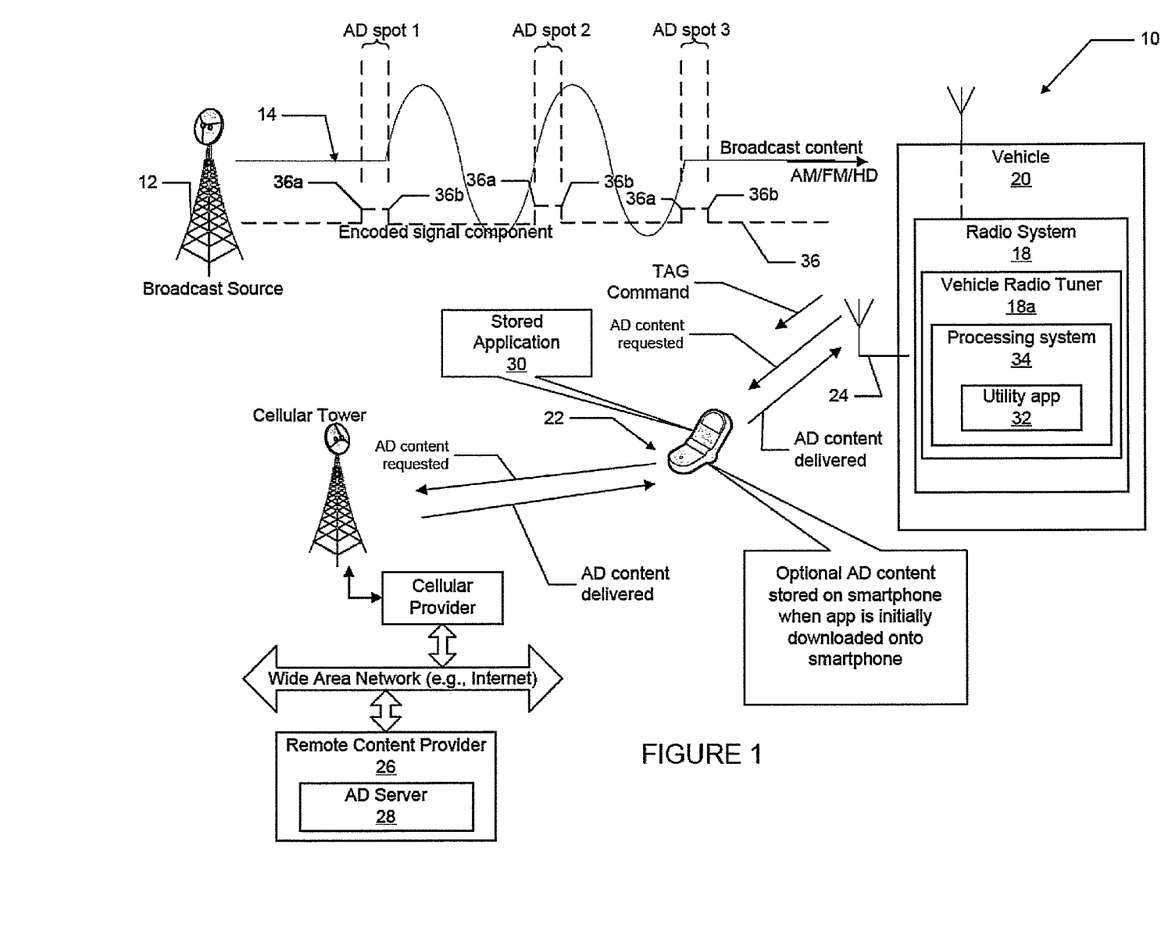
FIG. 1 is a high level block diagram illustration of a system in accordance with one embodiment of the present disclosure in which predetermined AD content is able to be seamlessly "inserted" into a broadcast signal being received at a vehicle radio of a vehicle, using the vehicle operator's cell phone to provide the predetermined AD content.

Referring to FIG. 1, there is shown a system 10 in accordance with one embodiment of the present disclosure for switching between playback of predetermined AD content and a broadcast signal being received. The system 10 may involve the use of a broadcast source 12 which transmits a broadcast signal 14 (AM/FM or HD radio). Simply for the purpose of explanation, it will be assumed that the broadcast signal 14 is an FM signal. The broadcast signal 14 is received by an antenna 16 associated with a vehicle radio tuner 18a of a radio system 18 within a vehicle 20 which an individual may be operating. The individual has a cellular phone 22, which in this example is a "smartphone" having its own processing, memory and wireless communications capabilities, as well known in the art.

The smartphone 22 is in contact with the vehicle radio tuner 18a through a wireless communications link with a second antenna 24, which may be designed to receive low power signals such as those used in accordance with the BLUETOOTH® wireless communications protocol. The smartphone 22 is also in wireless contact with a remote AD content provider 26 operating an AD server 28. The smartphone 22 may also include an application 30 stored in a memory thereof that the user has downloaded from a source of applications (not shown). The application 30 may relate to a particular broadcast source (i.e., radio station) that the user likes to listen to. Thus, the application 30 may be for a specific broadcast source, just for example a broadcast source having call letters WZZZ associated with FM frequency 105.1 MHZ in the metro Detroit, Mich. area. The application 30 may also operate to control the smartphone 22 to contact the remote AD content provider 26 and obtain specific AD content that has been created for specific types/classes of listeners of the broadcast source 12. In this regard, the initial downloading of the application may also involve having the user answer specific questions about the user's age, gender, profession/occupation, and other interests, which criteria may be used by the remote content provider 26 in more finely tailoring the supply of AD content to the user from the AD server 28. Optionally, a quantity of AD content may be provided when the application 30 is first downloaded onto the user's smartphone 22 so that the smartphone does not need to make a wireless connection with the remote content provider 26.

The vehicle radio tuner 18a may also have stored thereon a utility application 32 (i.e., software program) that is stored in a suitable memory (e.g., RAM) of a processing system 34 of the tuner. Alternatively, it will be appreciated that the processing system 34 and the utility application 32 could be part of a completely independent electronic subsystem which is independent of the vehicle's radio system 18, and which is interfaced to the vehicle's 20 electronics as needed to interact with the radio system 20 (e.g., through an auxiliary "IN" port). The utility application 32 may be started when the radio system 18 is turned on or when the vehicle 20 is started.

The utility application 32 may use the low power, wireless BLUETOOTH® communications link between it and the smartphone 22 to inform the smartphone when the user has selected a radio station that corresponds to the stored application 30. In this example, the selected radio station would be WZ77 and the stored application corresponds to the W77Z radio station. This causes the processing system 34 to begin monitoring the broadcast signal 14, and more specifically an encoded signal component 36 that is mixed in to the broadcast signal. In one example the encoded signal component may be an encoded harmonic signal component, provided that the broadcast signal 14 is an AM or FM analog broadcast. Otherwise, the encoded signal component 36 could simply be low magnitude digital pulses in an HD broadcast (i.e., not audibly perceptible to the user but still detectable with suitable electronic D/A detector circuitry). Still further, the encoded composite signal could be present in a sub-band within the HD1, HD2 or FM RDS stream (i.e., not in the same audio stream that the audio broadcast is played through). Simply for the purpose of providing one example implementation, the encoded signal component will be assumed to be an FM signal, with the encoded signal component 36 being a "harmonic" signal component.

The processing system 34 uses the utility application 32 to detect specific "markers" that are modulated in the harmonic signal component 36 of the broadcast signal 14 along with the primary audio signal content. In this regard it will be appreciated that the harmonic signal component 36 is transmitted concurrently with, and forms a portion of, the broadcast signal 14, but will be inaudible when the broadcast signal 14 is played back by the vehicle's radio system 18. The harmonic signal component 36 may be detected and monitored by the processing system 34 of the radio tuner 18a using band pass techniques or signal level detection techniques, or any other suitable means of detection. It is important to emphasize, however, that the harmonic signal component 36 does not degrade or otherwise audibly influence the playback of the audio content that is provided via the broadcast signal 14. In other words, the presence of the harmonic signal component 36 will not be apparent to the user who is listening to the playback of the broadcast signal 14 via the radio system 18.

With further reference to FIG. 1, merely for simplicity, the harmonic signal component 36 is illustrated as a digital waveform having a plurality of pulses that appear during times where an "AD spot" is present. A leading edge 36a of each pulse of the harmonic signal component 36 defines a "Start Marker" and the trailing edge 36b of each pulse defines an "End Marker". The duration between the Start Marker 36a and the Stop Marker 36b defines a time space that is concurrent with an "AD spot", or in other words a time slot corresponding to a commercial break where the broadcast source 12 would normally insert AD content into the broadcast signal 14. The Start Marker 36a is used by the utility application 32 and the processing system 34 to detect, in real time, that specific point in the broadcast signal 14 where the broadcast source 12 is starting a commercial break period and inserting AD content into its broadcast signal 14. Likewise, the Stop marker 36b defines that specific point in time in the broadcast signal 14 where the broadcast source 12 ends the commercial break (i.e., the AD spot) and begins retransmitting its primary content (e.g., music, talk radio, etc.).

It will also be appreciated that if an HD digital signal is being broadcast by the broadcast source 12, a "TAG" command could be selected from a suitable TAG command button on the vehicle radio system 18, or possibly from the user's smartphone 22, to indicate that the specific content being received (e.g., song) is to be purchased or otherwise identified for some other additional use at a later date/time. Another significant feature of the system 10 is the ability to track the location of the user's smartphone 22, and thus the real time location of the vehicle 20, using conventional location determining techniques. Such conventional techniques may involve triangulation with signal strength information provided from multiple cellular towers that are in range of the smartphone 22 and/or signals from satellites of the Global Positioning Satellite (GPS) system. Based on the determined real time location of the vehicle 20, the remote content provider 26 can even further tailor AD content provided from the AD server 28 so that specific restaurants, businesses or entertainment venues that are within a predetermined range (e.g., 5 miles) of the user's present location are provided during the AD spots.

Figure 2:
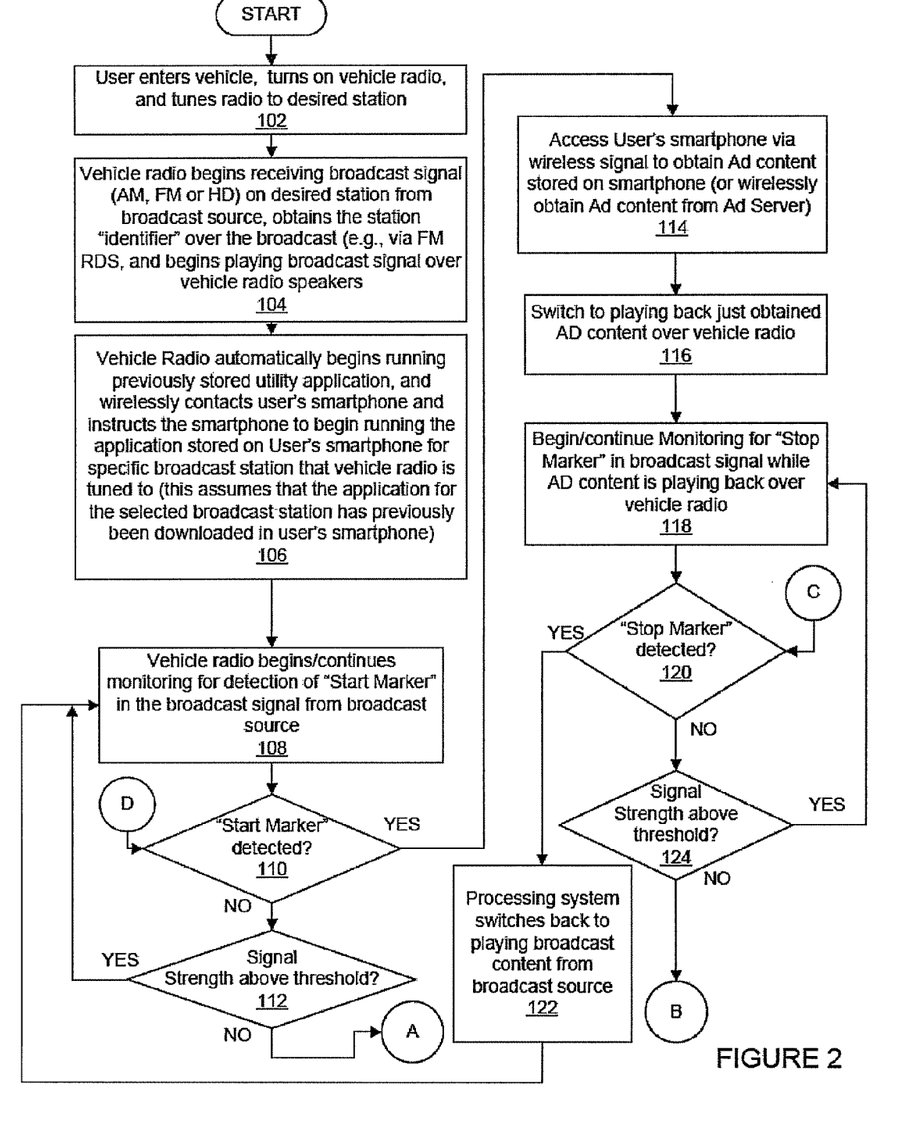
FIGS. 2 and 3 represent a high level flowchart of operations that may be performed by the system of FIG. 1 in inserting AD content into a broadcast signal being received and played back on a vehicle radio.

Referring now to FIG. 2, a flowchart 100 is shown describing in greater detail the operations that have summarized above which are being performed by the system 10. At operation 102 the user enters her/his vehicle, turns on the radio system and tunes to a desired station. For this example it will be assumed that the desired station is the WZZZ FM radio station mentioned above. At operation 104 the vehicle radio begins receiving the broadcast signal content from the WZZZ broadcast station 12, and then obtains the RDS information for the selected station, and then begins playing the received content over the speakers of the vehicle radio system 18. If an HD signal is being received, the station identifying information can be presented through the HD radio feed. Again, it will be assumed for this example that an FM signal is being received. The station identifying information may include the call sign for the received station, and possibly additional information like location for a station or possibly some other unique identifying information.

At operation 106 the vehicle radio system 18 automatically begins running the previously stored utility application 32 and wirelessly contacts the user's smartphone 22 via the BLUETOOTH® communications link. The utility application 32 may automatically instruct the smartphone 22 to begin running the application 30 stored on the smartphone for the specific broadcast station that the vehicle radio system 18 is tuned to. Alternatively, the user may be required to manually start the application 30 stored on the smartphone 22. In this example the application 30 will be for the W77Z radio station and it will be assumed that the smartphone 22 and the application 30 possess the functionality required to be started automatically by a suitable wireless signal received from the radio system 18.

At operation 108 the processing system 34 and the utility application 32 begin monitoring for the detection of a "Start Marker" in the FM broadcast signal 14 being broadcast from the broadcast source 12. At operation 110 a check is made if the "Start Marker" 36*a* has been detected. If not, then a check is made if the signal strength of the received broadcast signal 14 is above a predetermined minimum threshold, as indicated at operation 112. If it is, then operation 108 is repeated. If the check at operation 110 indicates that the "Start Marker" 36*a* has been detected, then at operation 114 the utility application 32 accesses the user's smartphone 22 via the BLUETOOTH wireless communications link with the smartphone to obtain AD content stored on the smartphone. This may involve the smartphone 22 contacting the remote content provider 26 to obtain the specific AD content from the AD server 28. Optionally the AD content could be stored in the smartphone's 22 memory and provided therefrom to the processing system 34. At operation 116 the processing system 34 controls the switching of the radio system 18 so that the AD content just obtained from the smartphone 22 may be played back over the vehicle's radio system 20, as indicated at operation 116.

Figure 3:
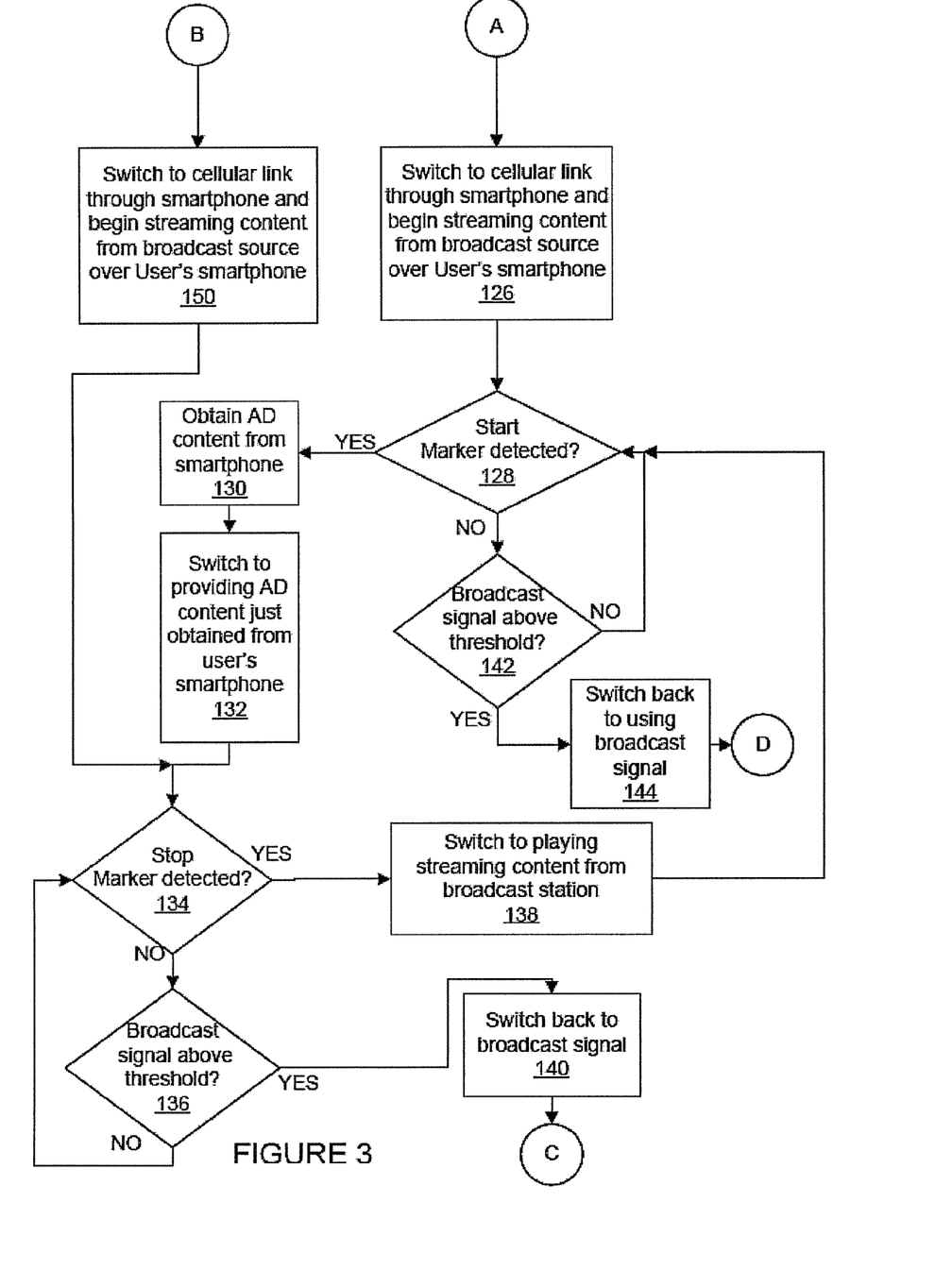

At this point, the processing system 34 will begin (or continue) monitoring for a "Stop Marker" 36*b* in the broadcast signal 14, as indicated at operation 118. This involves making a check for the "Stop Marker" 36*b*, as indicated at operation 120. If a "Stop Marker" is detected at operation 120, then the processing system 34 switches back to playing broadcast content from the broadcast source 12 (i.e., content delivered via broadcast signal 14), as indicated at operation 122. Alternatively, a "Stop Marker" or "end-of-file" indication may also be received from the smartphone 22 that tells the processing system 34 and the utility application 32 that the AD content being supplied by it has concluded. Both types of signal detection are contemplated as being handled at operation 120. Operation 108 is then repeated to start checking again for the next "Start Marker" 36*a*. If the check at operation 120 does not detect a "Stop Marker" 36*b*, then a check is made if the signal strength of the broadcast signal 14 is above the predetermined threshold, as indicated at operation 124. If this check produces a "YES" answer, then operation 118 is repeated. If it produces a "NO" answer, then operation 150 in FIG. 3 is performed. Similarly, if the signal strength check at operation 112 produces a "NO" answer, then operation 126 in FIG. 3 is performed.

Referring to FIG. 3, and as noted above, if either of the checks at operations 112 or 124 indicate that the signal strength has dropped below the predetermined threshold, then the processing system 34 knows to begin providing the broadcast content from a streaming signal source (not shown in FIG. 1). This assumes that the broadcast station W77Z in this example, also streams its broadcast over a wide area network, for example the Internet. At operation 126 then, the processing system 34 begins also receiving the streaming broadcast and then begins checking for a "Start Marker" in the streamed signal. In this example the streamed digital signal will also have some form of signal component by which a "Start Marker" may be included in the digital signal without otherwise affecting the quality of the played back signal content. At operation 128 a check is made if the "Start Marker" in the streamed signal is present, and if it has been detected, then the AD content is obtained from the user's smartphone for playback at operation 130. At operation 132 the processing system 34 switches to providing the AD content just obtained from the user's smartphone 22. At operation 134 the processing system 34 then starts checking for the presence of a "Stop Marker" in the streaming digital signal being received. If the check at operation 134 detects that a "Stop Marker" has been received, the processing system 34 will then switch back to playing the streaming digital content from the broadcast station, as indicated at operation 138. Again, the "Stop Marker" may have been received directly from the smartphone 22 or an end-of-file indication supplied by the Smartphone to indicate that the AD content has finished. Operation 128 will then be repeated. If the check at operation 134 indicates the "Stop Marker" has not been detected, then a check is made at operation 136 to see if the signal strength of broadcast signal 14 is back above the predetermined minimum threshold. If it is, then at operation 140 the processing system switches back to using the broadcast signal 14, and then jumps back to operation 120 in FIG. 2.

If the "Start Marker" was not detected at operation 128 in FIG. 3, then a check is made if the signal strength of the broadcast signal is above the minimum predetermined threshold, as indicated at operation 142. If it is, then the processing system 34 switches back to using the broadcast signal 14, and then operation 110 in FIG. 2 is repeated.

From the foregoing it will be appreciated that the present system 10 and method is able to receive a broadcast signal and to monitor automatically switch back and forth between playing the content provided via the broadcast signal and playing highly tailored AD content from an independent source of AD content. Importantly, the AD content obtained from the independent source of AD content is only played during those times of the broadcast signal where commercial breaks would ordinarily be occurring. The system 10 and method further automatically and seamlessly detects when the commercial break periods are beginning and when they end, so that the user is able to receive the programming content (e.g., music, talk radio, etc.) from the broadcast source without interruption. The system and method further is able to provide highly tailored AD content based on the real time location of the user, when this feature is implemented in the system 10. Still further, the system and method is able to automatically and seamlessly switch between the broadcast signal and a streaming digital signal, in the event the signal strength of the broadcast signal form the broadcast source becomes too weak to receive. The highly tailored AD content is tailored for each specific user, and enables advertisers to even more effectively promote their products and services to specific listeners.

Figure 4:
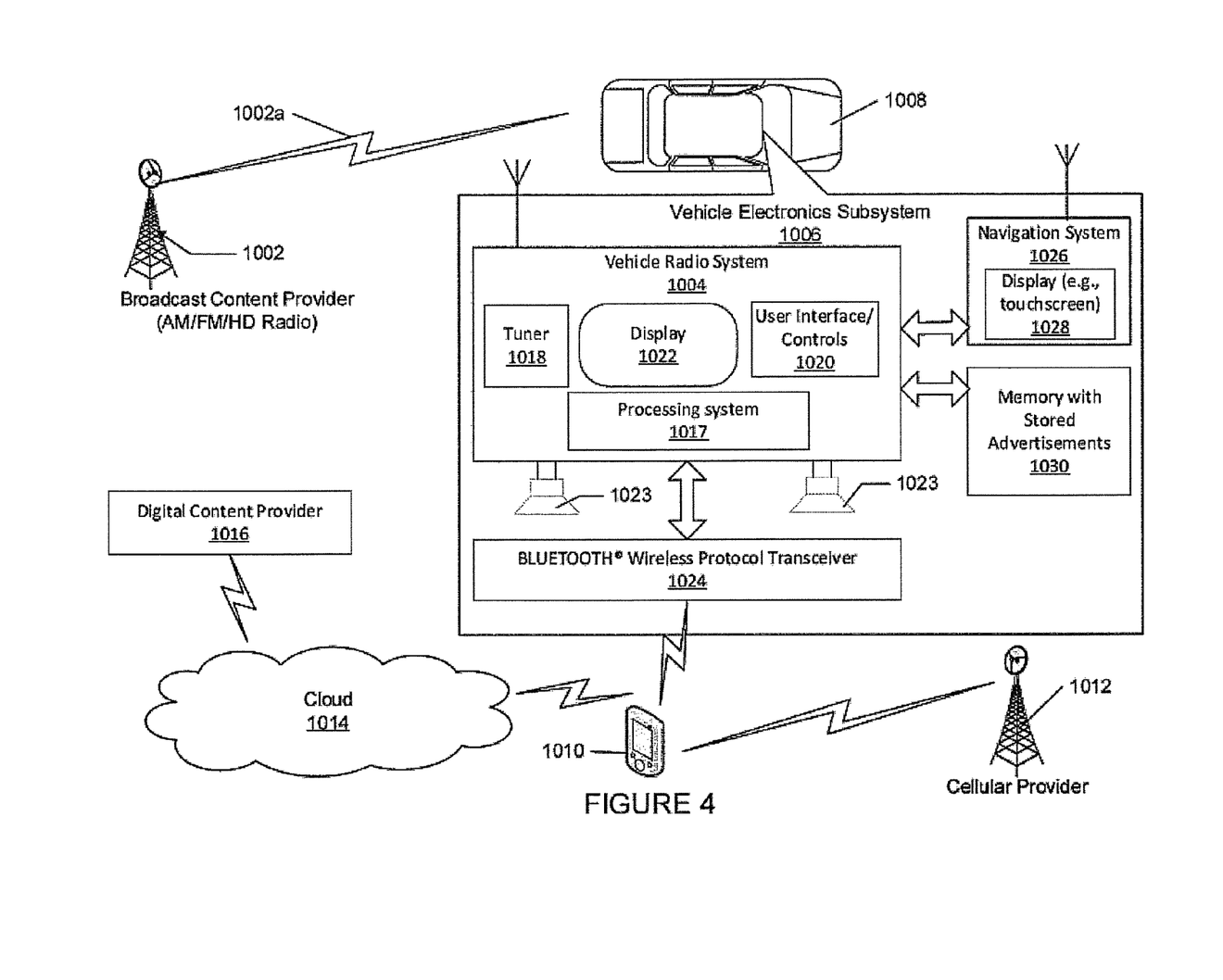
FIG. 4 is a high level block diagram of one implementation of a system in accordance with the present disclosure for collecting "batches" of advertising content, and selectively inserting and playing back specific ones of the collected advertisements over a vehicle radio system during times where a commercial break is occurring in the broadcast that the user is listening to over the radio system.

Referring to FIG. 4, a system 1000 is shown in accordance with another embodiment of the present disclosure. The system 1000 provides the added important feature of serving up stored advertisements, during commercial break periods, that are relevant to the geographic area in which the user is present while the user is travelling in a motor vehicle.

In FIG. 4 a broadcast station 1002 broadcasts content such AM/FM content, HD radio content, etc., that is received by a vehicle radio system 1004 of a vehicle electronics subsystem 1006. The vehicle electronics subsystem 1006 is located within a motor vehicle 1008. A user's smartphone 1010 may also be in wireless communication with the vehicle radio system 1004, as well as a cellular provider 1012, and one or more entities via the cloud 1014. One such entity is indicated as a digital content provider 1016, although it will be appreciated that virtually any entity that is able to communicate with the user through his/her smartphone could potentially be accessed via the cloud 1014. Another such entity could be a third party 1015 that collects information on advertisements that are acted on by the user of the vehicle 1008, as will be explained in greater detail in the following paragraphs.

The vehicle electronics subsystem 1006 may include a processing system 1017, a tuner 1018, a user interface/control subsystem 1020, a display 1022, and one or more speakers 1023. The vehicle radio subsystem 1004 may be in communication with a short range wireless transceiver 1024, such as a BLUETOOTH® wireless protocol transceiver 1024. Alternatively, an interface capable of making a hardwired connection with the smartphone 1010, for example a serial interface such as a USB interface 1024a, may be used to interface the smartphone 1010 to the radio system 1004. For convenience, the following discussion will use the example of the wireless transceiver 1024 being implemented, and will reference the wireless transceiver as the "BLUETOOTH® wireless protocol transceiver 1024." The BLUETOOTH® wireless protocol transceiver 1024 may be used to create a wireless communications link between the user's smartphone 1010 and the vehicle radio system 1004. In this manner content delivered via the cloud 1014, or via any other remote entity, may be relayed to the vehicle radio system 1004 either for immediate playback or stored for playback at a later time.

The vehicle radio system 1006 also may include a navigation system 1026 having a display 1028. The display 1028 may be a touchscreen display. A memory 1030 may be used to store pre-loaded advertisements pertaining to various establishments. For example, such advertisements may be from retail establishments such as department stores, coffee shops, automotive dealerships or tune-up/repair facilities, restaurants, health clubs, grocery stores, home improvement stores, car washes or detailing shops, or virtually any other establishment that offers a product or service that might be useful to the user. Advertisements from any or all such establishments may be pre-loaded into the memory from some external database using the BLUETOOTH wireless protocol transceiver 1024 either at the time of purchase of the vehicle, when the vehicle is serviced at a dealership, or even periodically using advertising content obtained by the user's smartphone via the cloud 1014. For example, various Internet search engine companies (Google, Inc. and Yahoo, Inc.) provide maps which have retail and other establishments indicated thereon. Accessing such maps periodically in real time may permit the establishments for which advertisements are stored in the memory 1030 to be updated to reflect those establishments that are within a reasonably close geographic proximity to the user at any given time. Therefore, as the user drives from one city to another during a long drive, the advertisements stored in the memory 1030 that are available for playback are continuously updated to reflect those establishments that are reasonably close in proximity to the user. The reasonable proximity may vary, but it is anticipated that advertisements corresponding to establishments located within at least 5-10 miles of the real time location of the user may be stored in the memory 1030.

The navigation system 1026 may periodically report the location of the vehicle 1008 to the vehicle's radio system 1004 as the user is operating the vehicle 1008. It will be appreciated that the smartphone 1010 may also have a navigation application thereon which can periodically provide real time data on the precise location of the vehicle 1008 to the vehicle radio system 1004.

Figure 5:
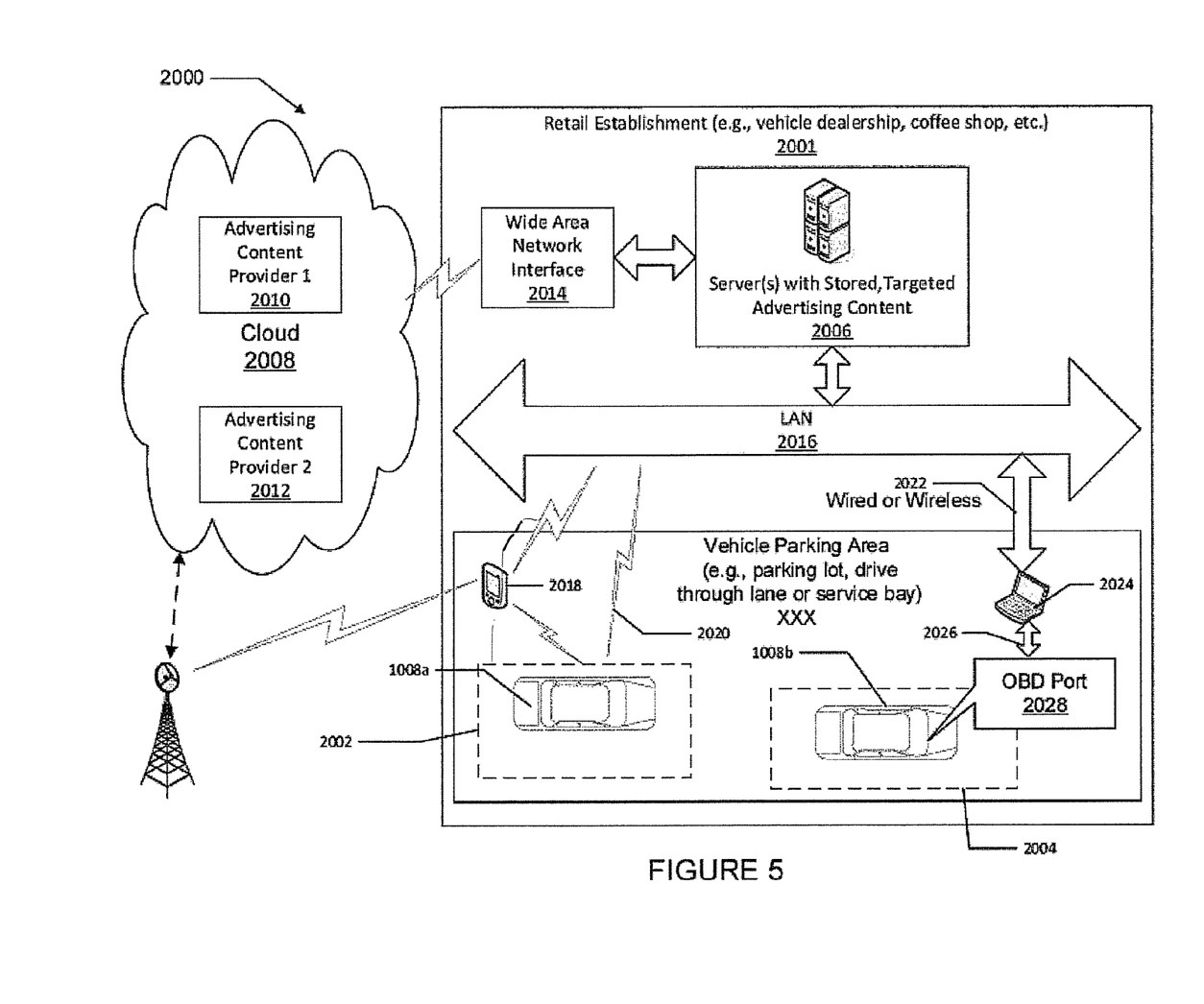
FIG. 5 is a high level diagram illustrating how targeted advertising content may be downloaded from an establishment to an on-board electronic memory storage component of a motor vehicle while the user is visiting the establishment.

Referring now to FIG. 5, a system 2000 is shown for delivering (i.e., downloading) targeted advertisements to the vehicle 1008 of the system 1000 described in connection with FIG. 4. In this example two vehicles 1008a and 1008b are referenced, and it will be understood that each of the vehicles 1008a and 1008b may incorporate a vehicle electronics subsystem identical or similar to vehicle electronics subsystem 1006 described in connection with the system 1000 shown in FIG. 4. For the purpose of this example, it will be assumed that the vehicle electronics subsystem 1006 shown in FIG. 4 will be incorporated into each of the vehicles 1008a and 1008b.

The system 2000 of FIG. 5 may potentially be implemented at the user's home, or at a retail establishment 2001, or at any other establishment or entity where the opportunity to download targeted advertisements to the users of the vehicles 1008a and 1008b presents itself. Examples of some such establishments where a free WiFi connection is often provided are coffee shops, book stores and restaurants. Other such establishments could include vehicle dealerships or service centers, hospitals, or even health clubs which provide WiFi connectivity to guests or members. Providing WiFi connectivity may be helpful in some implementations of the system 2000 but it is not needed for other implementations. It is a significant advantage of the present disclosure that even those establishments that are not providing WiFi connectivity, but which still will have access to the vehicle, such as a vehicle dealership which has the opportunity to access the vehicle's on-board diagnostic (OBD) port, will be able to download targeted advertising content to the vehicle's electronic subsystem 1006.

For the purpose of the following discussion, the establishment 2001 shown in FIG. 5 will be described as being a motor vehicle dealership that has a parking lot 2002 as well as a service bay 2004 in which the vehicles 1008a and 1008b may be parked. The dealership 2001 may include a server (or servers) 2006 for storing targeted advertisements. The servers may be on site or located in the cloud 2008 (i.e., off site). Targeted advertisements may be obtained via the cloud 2008 where one or more advertising content providers 2010 and 2012 are accessible. A wide area network interface 2014 may connect the server 2006 to the cloud 2008. The server 2006 may be in communication with the vehicle's 1008*a* and 1008*b* via a local area network (LAN) 2016. In one instance the server 2006 is in communication with the vehicle 1008*a* via a personal electronic device 2018 such as a smartphone 2010, which may be a smartphone of the vehicle owner. In another instance the server 2006 may be in communication with the vehicle 1008*a* via a direct wireless connection 2020 between the vehicle's electronics subsystem (such as subsystem 1006 of FIG. 4) and the LAN 2016.

In the example implementation of FIG. 5, the vehicle 1008*b* may be parked in the service bay or service area 2004 of the dealership 2001. In this location, the vehicle's electronic subsystem (such as subsystem 1006 of FIG. 4) may be accessed by a wireless or hardwired connection 2022 and a suitable electronic device, such as a laptop 2024 (or alternatively a tablet or smartphone), that connects to a suitable cable 2026, which is in turn connected to the vehicle's OBD port 2028. Thus, whether a vehicle is parked in the parking lot 2002 or actually parked in service area or service bay 2004, the vehicle's electronics subsystem 1006 is accessible by the dealership 2001. The ability to access the vehicle radio system 1004 of the vehicle 1008*b* via the OBD port 2028 enables older vehicles that do not have a short range wireless connectivity system (i.e., Bluetooth® wireless communications protocol system) to still take advantage of the system 2000.

The server 2006 may be used to download batches of stored, targeted advertising content to the memory (such as memory 1030 in FIG. 4) of the vehicle 1008*a* or 1008*b*. In this example the dealership 2001 may typically have some information on record for the vehicle owner such as gender, age, etc., which can be used to more effectively deliver specific advertisements to the vehicle owner. For example, if the vehicle owner is a female over the age of 50, then certain advertisements tailored to females over the age of 50 may be selected, and if the owner is a male under the age of 40, then a completely different group of advertisements may be selected for downloading. Those skilled in the art will appreciate that the present disclosure provides a means for downloading, storing and providing highly selective, targeted advertising content to the user's vehicle, and where the targeted advertisements may be inserted during commercial breaks when the user is operating the vehicle.

Still another implementation could be using the user's smartphone 2018 to make a wireless connection 2030 via the cloud 2008, as shown in FIG. 5. The wireless connection 2030 may use the user's 4G or 3G cellular network to help access the advertising content providers 2010 and/or 2012 to download targeted advertisements to the vehicle 1008*a*.

Another implementation could involve making a wireless link directly with the vehicle's Bluetooth® communications transceiver 1024 as the vehicle 1008*a* or 1008*b* travels slowly through a drive through lane of a fast food or coffee shop, and using the wireless link to download batches of advertisements or future promotions/advertisements to the user's vehicle radio system 1004. Still another implementation could be downloading batches of advertisements to the vehicle's radio system 1004 as the vehicle 1008*a* or 1008*b* moves slowly through a toll booth on an interstate highway. Such advertisements could alert the vehicle operator to business establishments (restaurants, shopping malls, etc.) that are in the vicinity of the tool booth and conveniently located off of the highway.

In another implementation the user's own WiFi service at her/his home could be used to automatically download batches of new advertisements to the user's vehicle on a predetermined schedule, similar to what is done for computer operating system and virus detection profile updates for laptop and desktop computers. This is provided, of course, that the user is able to park the vehicle in sufficiently close proximity to her/his home to make the wireless connection with her/his WiFi service.

Figure 6:
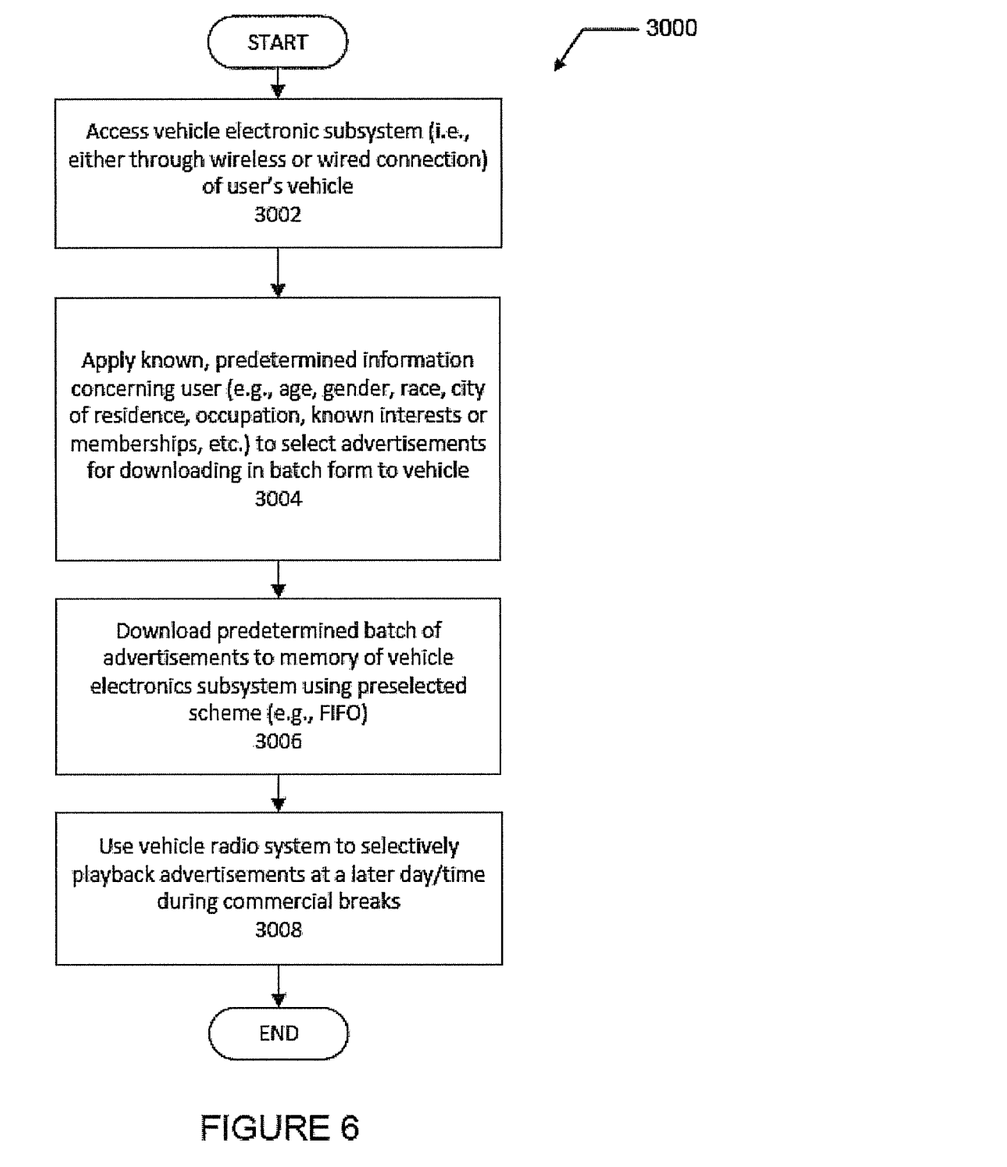
FIG. 6 is a high level flowchart illustrating one example of specific operations that may be performed in downloading targeted advertising content in batch form to an on-board memory system of a user's vehicle.

Referring to FIG. 6, a flowchart 3000 is shown illustrating one example of various operations that may be performed by the system 2000 in downloading batches of predetermined advertising content to the user. At operation 3002 the vehicle's electronics subsystem 1006 is accessed either through a wireless or wired connection, as described above. At operation 3004 any known, predetermined information about the user is applied, like a filter, to determine a suitable batch of advertisements to download. Various known information about the user such as age, gender, race, city/state of residence, occupation, level of education, known interests or memberships or political affiliations, known business affiliations, etc., may be used to tailor the batch of advertisements delivered for storage to the user's vehicle. At operation 3006, the selected advertisements are downloaded as a batch to the memory 1030 of the vehicle electronics subsystem 1006 using a preselected scheme, such as "first in first out" (FIFO). With a FIFO scheme, the oldest advertisements contained in the memory will be dropped if insufficient memory space is available to accommodate the entire batch of advertisements being downloaded to the memory 1030. However, any other scheme for determining how to prioritize advertisements may be used in the event the memory 1030 is already full with previously stored advertisements. At operation 3008 the vehicle radio system 1004 accesses the stored advertisements in the memory 1030 during commercial breaks to play back one or more of the stored advertisements.

The various embodiments discussed herein all enable highly targeted advertisements to be downloaded in "batches" and stored on a memory of the vehicle's radio system 1004 for playback at a later time. A principal advantage of the system 2000 is the ability to quickly and conveniently download targeted advertisements to the user's vehicle. The downloading can be performed seamlessly without any physical connections to the user's vehicle being made, or can even be made via the vehicle's OBD port. Downloading can be accomplished in seconds or less and in a manner that does not inconvenience the user in her/his operation of the vehicle.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for providing advertising (AD) content to a radio system of a vehicle, the system comprising:
   a smartphone having a stored application thereon related to a specific broadcast station;

a utility application operably associated with the radio system of the vehicle and configured to inform the smartphone when the radio system is tuned to the specific broadcast station;

the radio system including a processor configured to electronically detect an inaudible start maker and an inaudible stop marker in a broadcast signal being received by the radio system from the specific broadcast station, the start marker and the stop marker both being represented by wireless signal components mixed in, or included with, the broadcast signal but which are inaudible, and the processor further configured to inform the smartphone when the start marker is detected, the start marker and stop marker defining a time interval where the broadcast station is providing at least one advertisement in the broadcast signal;

the smartphone configured to electronically obtain and electronically transmit AD content from ad content source independent of the broadcast signal, to the processor of the radio system; and the processor configured to electronically insert the AD content obtained from the ad content source into the broadcast signal received by the smartphone during the time interval in the broadcast signal for playback using the radio system, and then to resume playing the broadcast signal over the radio system when the stop marker is detected.

2. The system of claim 1, wherein ad content source comprises the smartphone having the AD content stored thereon.

3. The system of claim 1, wherein the smartphone is configured to wirelessly access a cloud-based advertising content provider to obtain the AD content for use during the time interval in the broadcast signal.

4. The system of claim 1, wherein the smartphone is configured to establish a short range, wireless communications link with the radio system.

5. The system of claim 1, wherein the processor is configured to use a navigation system of at least one of the vehicle or the smartphone to determine a geographic real time location of the vehicle, and wherein the geographic real time location is used by the processor to help select the AD content that is to be inserted in the broadcast signal.

6. The system of claim 1, wherein the AD content is selected by the processor based on previously defined characteristics of a user of the vehicle.

7. The system of claim 1, wherein the previously defined characteristics of the user of the vehicle include at least one of:
age of the user;
gender of the user;
race of the user;
city and state of residence of the user;
occupation of the user;
level of education of the user;
one or more known interests of the user;
one or more known memberships of the users;
one or more known political affiliations of the user; and
one or more known business affiliations of the user.

8. The system of claim 7, wherein additional AD content is wirelessly provided to at least one of the radio system or the smartphone while the vehicle is stationary or moving at a predetermined location.

9. A system for providing advertising (AD) content to a user of a radio system of a vehicle, the system comprising:
a radio system including a processor configured to electronically detect a start maker and a stop marker in wireless signal content being broadcast from a broadcast signal source, and received by the radio system from the broadcast signal source, and played by the radio system, the start marker and stop marker defining inaudible signal components mixed in or added to the wireless signal content when the wireless signal content is played over the radio system, and where the start marker and the stop marker define a time interval where the signal source is providing at least one advertisement in the signal;

a remote source of targeted advertising content which is independent of the wireless signal content being broadcast from the broadcast signal source;

the radio system configured to electronically receive at least one targeted advertisement from the remote source of targeted advertising content and to store the at least one targeted advertisement for future playback on the radio system; and the processor configured to electronically insert the AD content for playback over the radio system during the time interval in the signal, and to resume playing the wireless signal content over the radio system when the stop marker is detected.

10. The system of claim 9, wherein the vehicle includes a navigation system, and wherein the targeted advertisement is selected in part based on a real time geographic location of the vehicle.

11. The system of claim 9, wherein the radio system is configured to receive one or more batches of target advertisements from the remote source of targeted advertising content, when advertising content is to be loaded into the radio system for storage.

12. The system of claim 9, wherein the targeted advertisement is selected based on a characteristic of the user, wherein the characteristic includes at least one of:
age of the user;
gender of the user;
race of the user;
city and state of residence of the user;
occupation of the user;
level of education of the user;
one or more known interests of the user;
one or more known memberships of the users;
one or more known political affiliations of the user; and
one or more known business affiliations of the user.

13. The system of claim 9, further comprising a smartphone, and wherein the smartphone is configured to wirelessly obtain advertising content from the remote source of targeted advertising content.

14. The system of claim 9, wherein the vehicle comprises an on-board diagnostic (OBD) port in communication with the processor, and wherein the targeted advertisements are loaded as batches of targeted advertisements into the OBD port from the remote source of targeted advertising content.

15. The system of claim 9, wherein the signal is a streaming signal received wirelessly via a smartphone located in proximity to the radio system.

16. The system of claim 9, wherein the signal is one of an AM signal or an FM being broadcast from a broadcast station.

17. A method for providing advertising (AD) content to a radio system of a vehicle, the method comprising:
using a smartphone having a stored application thereon related to a specific broadcast station;
causing the radio system of the vehicle to inform the smartphone when the radio system is tuned to the specific broadcast station;
using the radio system to electronically detect an inaudible start maker and an inaudible stop marker mixed into or added into broadcast signal content being received by the radio system from the specific broadcast station;

using the radio system to electronically signal the smartphone when the start marker is detected, and wherein the start marker and the stop marker define a time interval where the broadcast station is providing at least one advertisement in the broadcast signal content;

using the smartphone to provide AD content to the radio system, wherein the AD content is obtained by the smartphone from an ad content source independent of the broadcast signal; and using the radio system to insert the AD content during the time interval in the broadcast signal content for playback, when the start marker is detected, and then to resume playing back the broadcast signal content when the stop marker is detected.

18. The method of claim 17, further comprising storing a plurality of different advertisements on the smartphone for use by the radio system, depending on a detected real time location of the vehicle.

19. The method of claim 17, further comprising storing a plurality of different advertisements in a memory of the radio system for future use by the radio system.

20. The method of claim 17, further comprising storing batches of different advertisements at a time in at least one of a memory of the radio system or the smartphone, when a remote advertisement content source is in communication with at least one of the radio system or the smartphone.

* * * * *